(12) United States Patent
Fan

(10) Patent No.: US 10,120,117 B2
(45) Date of Patent: Nov. 6, 2018

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 201 days.

(21) Appl. No.: 15/109,425

(22) PCT Filed: May 25, 2016

(86) PCT No.: PCT/CN2016/083292
§ 371 (c)(1),
(2) Date: Jun. 30, 2016

(87) PCT Pub. No.: WO2017/181477
PCT Pub. Date: Oct. 26, 2017

(65) Prior Publication Data
US 2018/0106946 A1     Apr. 19, 2018

(30) Foreign Application Priority Data

Apr. 22, 2016 (CN) .......................... 2016 1 0256089

(51) Int. Cl.
*F21V 8/00* (2006.01)
*G02B 5/20* (2006.01)

(52) U.S. Cl.
CPC ........... *G02B 6/0026* (2013.01); *G02B 5/207* (2013.01); *G02B 6/002* (2013.01); *G02B 6/0031* (2013.01); *G02B 6/0056* (2013.01); *G02B 6/0073* (2013.01)

(58) Field of Classification Search
CPC .... G02B 6/0026; G02B 6/0031; G02B 6/207; G02B 6/0073; G02B 6/002; G02B 6/0056
See application file for complete search history.

(56) References Cited

U.S. PATENT DOCUMENTS 5,712,694 A * 1/1998 Taira .................... G02B 6/0023
349/175
6,163,351 A * 12/2000 Nakayama ........... G02B 6/0053
349/115

(Continued)

FOREIGN PATENT DOCUMENTS

CN      1952754 A      4/2007
CN    101071225 A     11/2007

(Continued)

*Primary Examiner* — Thomas M Sember
(74) *Attorney, Agent, or Firm* — Andrew C. Cheng

(57) ABSTRACT

The present invention provides a backlight module. The backlight module includes a plastic frame, a backlight source and a light guide plate. The backlight source and the light guide plate are received in the plastic frame. The light guide plate includes a light incident surface and a light emitting surface. The backlight source includes a circuit board, a reflecting collimator lens fixed to the circuit board and a LED lamp disposed inside the reflecting collimator lens. The reflecting collimator lens includes a parabolic reflecting surface, and the LED lamp is located at a center location of the parabolic reflecting surface. The light incident surface is covered with a color polarizing layer, and the parabolic reflecting surface faces toward the color polarizing layer. The present invention also discloses a display device.

18 Claims, 1 Drawing Sheet

(56) References Cited

U.S. PATENT DOCUMENTS

| | | | | |
|---|---|---|---|---|
| 6,497,492 | B1 * | 12/2002 | Benoit | G02B 6/0036 349/62 |
| 2008/0297696 | A1 | 12/2008 | Banerjee | |
| 2012/0154711 | A1 | 6/2012 | Park | |

FOREIGN PATENT DOCUMENTS

| | | | |
|---|---|---|---|
| CN | 101408696 | A | 4/2009 |
| CN | 101614908 | A | 12/2009 |
| CN | 101673006 | A | 3/2010 |
| CN | 101858566 | A | 10/2010 |
| CN | 102691931 | A | 9/2012 |
| CN | 103392142 | A | 11/2013 |
| CN | 203811949 | U | 9/2014 |
| CN | 104303223 | A | 1/2015 |
| CN | 105259705 | A | 1/2016 |

* cited by examiner

BACKLIGHT MODULE AND DISPLAY DEVICE

CROSS REFERENCE

The claims of this application have submitted to the State Intellectual Property Office of the People's Republic of China (SIPO) on Apr. 22, 2016, Application No. 201610256089.7. The priority right based on the China application has a title of "Backlight module and display device". The entire contents of the above-mentioned patent application will be incorporated in the present application through citing.

FIELD OF THE INVENTION

The present invention relates to a liquid crystal display technology field, and more particularly to a backlight module and a display device.

BACKGROUND OF THE INVENTION

A liquid crystal display device is a main flat display technology in the current market. The display device requires a backlight as a light source to illuminate the liquid crystal display device. A conventional backlight module includes a backlight source formed by LED. A light emitted from the backlight source become a surface light source and emitting out through the backlight module. Through a light homogenization function of a diffusion sheet, the light is emitted out from the backlight module. After passing through a liquid crystal panel, the panel can display a required image for us. Currently, in the liquid crystal display device, a white LED is usually adopted as a backlight source. The most common white LED is an LED formed by a blue light emitting chip and a yellow YAG phosphor. When an LED adopting the yellow YAG phosphor matches with the liquid crystal panel, the color saturation is lower, and the color of the display device is not colorful enough.

SUMMARY OF THE INVENTION

The technology problem solved by the present invention is to provide a backlight module and a display device in order to increase a gamut saturation of a backlight.

The backlight module described by the present application includes a plastic frame, a backlight source and a light guide plate. Wherein, the backlight source and the light guide plate are received in the plastic frame; the light guide plate includes a light incident surface and a light emitting surface; the backlight source includes a circuit board, a reflecting collimator lens fixed to the circuit board and a LED lamp disposed inside the reflecting collimator lens; the reflecting collimator lens includes a parabolic reflecting surface, and the LED lamp is located at a center location of the parabolic reflecting surface; the light incident surface is covered with a color polarizing layer, and the parabolic reflecting surface faces toward the color polarizing layer.

Wherein, the light guide plate includes a bottom surface disposed oppositely to the light emitting surface, the light incident surface is connected with the bottom surface and the light emitting surface, and an included angle is formed between the light incident surface and the bottom surface.

Wherein, the color polarizing layer includes a first color film layer and a second color film layer overlapped with the first color film layer, and a refractive index of the first color film layer is greater than a refractive index of the second color film layer.

Wherein, the color polarizing layer includes multiple first color film layers and multiple second color film layers, the first color film layers and the second color film layers are disposed alternately and are overlapped, and a refractive index of each first color film layer is greater than a refractive index of each second color film layer.

Wherein, the first color film layer is made of one of ZnS, $TiO_2$, CeO, $CeO_2$, $Ta_2O_5$ and $SnO_2$.

Wherein, the second color filter is made of one of $SiO_2$, $MgF_2$, $NaAlF_6$, $ThF_4$ and $BaF_2$.

Wherein, the color polarizing layer further includes a glass substrate, and the glass substrate is used for carrying the first color film layer and the second color film layer.

Wherein, a range of a wavelength that can pass through the color polarizing layer is a light of P polarization state. Transmittances of the P wave in ranges of 420-475 nm, 510-545 nm and 610-680 nm are about 90%. Transmittances of the P wave in ranges of 480-505 nm and 555-605 nm are about 30%. A polarization degree of the transmitted light in a range of 430 nm-680 nm >95%.

Wherein, the included angle between the light incident surface and the bottom surface is greater than 0 degree and less than 90 degrees.

Wherein, the backlight module further includes a reflector plate, the reflector plate is installed in the plastic frame, and the light guide plate is overlapped on the reflector plate.

Wherein, the backlight module further includes a heat dissipation part, and the heat dissipation part is located at a side of the backlight source.

The display device described by the present application includes the backlight module and a liquid crystal panel, and the liquid crystal panel is installed on the backlight module, a light emitted from the backlight source enters the liquid crystal panel after emitted from the light emitting surface of the light guide plate.

The reflecting collimator lens of the backlight module can reflect a light emitted from the LED lamp to the color polarizing layer with an approximately vertical angle. Because the light entering the color polarizing layer is the approximately vertical angle, the present invention can increase the polarization degree of the backlight, a selection property of a high band pass and pass rate of a band pass of wave band so as to increase the gamut saturation.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail.

Figure 1:
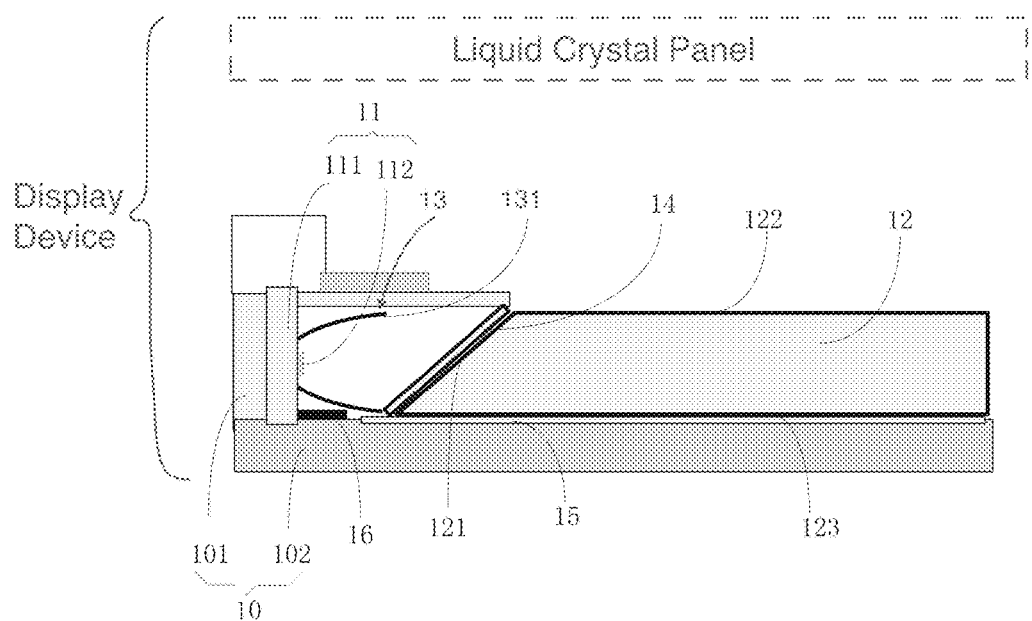
FIG. 1 is a schematic cross-sectional view of a backlight module in a preferred embodiment of the present invention, and a liquid crystal panel being schematic shown to illustrate spatial relationship between the backlight module and the liquid crystal panel.
Figure 1A:
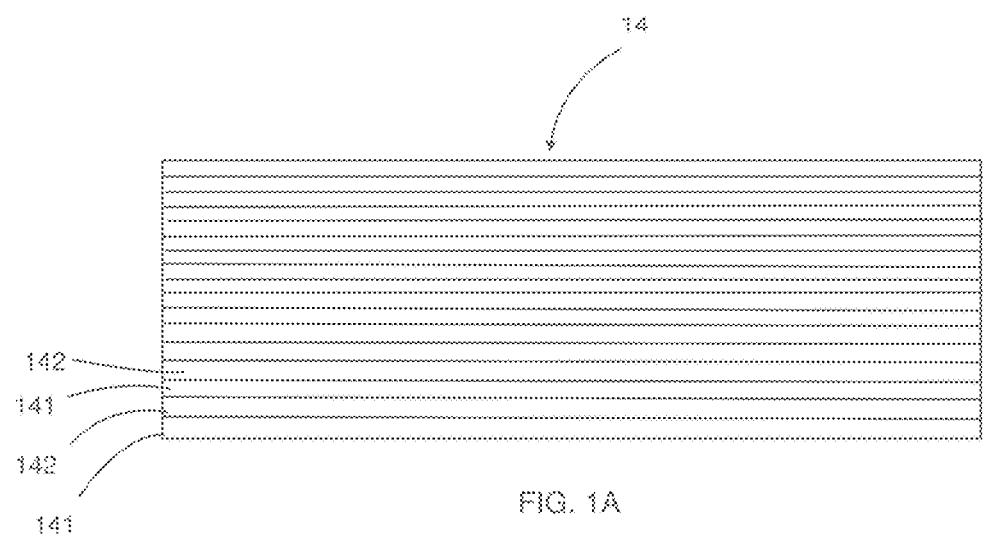
FIG. 1A is a schematic view showing an example of a color polarizing layer of the backlight module that comprises eight first color film layers and eight second color film layers alternately stacked on each other.

With reference to FIG. 1, the present invention provides a backlight module and a display device having the same. The display device further includes a liquid crystal panel (shown in phantom lines), and the liquid crystal panel is installed on the backlight module. In the present embodiment, the backlight module includes a plastic frame 10, a backlight source 11 and a light guide plate 12. The backlight source 11 and the light guide plate 12 are received in the plastic frame 10. The light guide plate 12 includes a light incident surface 121 and a light emitting surface 122. The backlight source 11 includes a circuit board 111, a reflecting collimator lens 13 fixed to the circuit board 111 and a LED lamp 112 disposed inside the reflecting collimator lens 13.

The reflecting collimator lens 13 includes a parabolic reflecting surface 131. The LED lamp is located at a center location of the parabolic reflecting surface 131, that is, a focus location of the parabolic reflecting surface 131. The parabolic reflecting surface 131 surrounds the LED lamp 112. The light incident surface 121 is covered with a color polarizing layer 14, and the parabolic reflecting surface 131 faces toward the color polarizing layer 14. The LED lamp 112 is located between the parabolic reflecting surface 131 and the color polarizing layer 14. The parabolic reflecting surface 131 of the reflecting collimator lens 13 can reflect a light emitted from the LED lamp 112 to the color polarizing layer 14 with an approximately vertical angle in order to increase the polarization degree of the backlight, a selection property of a high band pass of RGB three primary colors and pass rate of a band pass of wave band so as to increase the gamut saturation.

In the present embodiment, the plastic frame 10 is a rectangular frame structure, including a side frame 101 and a bottom frame 102. The side frame and the bottom frame are surrounded to form a receiving space for receiving a backlight source 11, a light guide plate 12 and the reflecting collimator lens 13. The backlight module further includes a reflector plate 15. Specifically, the reflector plate 15 is installed on a bottom frame 102 of the plastic frame 10, the light guide plate 12 is installed on the reflector plate 15. Specifically, the reflector plate 15 is as a bottom plate of the plastic frame 10 and forms a rectangular groove structure with the plastic frame 10 for carrying the light guide plate 12 and receiving the backlight source 11 and the reflecting collimator lens 13. A portion of the light emitted from the LED lamp 112 that is not entering the light guide plate 12 or the light leaked out from the light guide plate 12 is reflected by the reflector plate 15 back to the light guide plate 12 in order to fully utilizing the light source.

The number of the LED lamp is multiple, and are arranged as a straight line on a surface of the circuit board 111. Each LED lamp 112 is covered with the reflecting collimator lens 13. The circuit board 111 is installed on the side frame 101 such that the LED lamp faces toward the light guide plate 12. The backlight module further includes a heat dissipation part 16. The heat dissipation part 16 is located on the bottom frame 102 and at a side of the backlight source 11. Specifically, the heat dissipation part 16 is located at a side of the backlight source 11 closed to the reflector plate for dissipating heat for the backlight source 11.

The light guide plate 12 is a rectangular plate for receiving the light emitted from the LED lamp 112 and after homogenizing the light, the light is emitting out of the light emitting surface. The light incident surface 121 is connected with the light emitting surface 122. The light incident surface 121 is a side surface of the light guide plate 112. The light emitting surface of the light guide plate 12 is provided with an optical thin film, and the optical thin film is overlapped on the light emitting surface 122. The light guide plate 12 includes a bottom surface 123 disposed oppositely to the light emitting surface 122. The light incident surface 121 is connected with the bottom surface 123 and the light emitting surface 122, an included angle is formed between the light incident surface 121 and the bottom surface 123. The included angle between the light incident surface 121 and the bottom surface 123 is greater than 0 degree and less than 90 degrees. The present embodiment preferably selects 30 degrees. The backlight module utilizes the reflecting collimator lens 13 can reflect the light emitted from the LED lamp to the color polarizing layer 14 with an approximately vertical angle. Each of the color polarizing layer 14 and the light incident surface 121 is disposed as a tilt angle such that a half cone angle of the collimator light≥20. That is, the collimator light is incident to the light guide plate with an angle substantially equal to the Brewster angle in order to increase the polarization degree of the backlight and a pass rate of a band pass of wave band so as to save a brightness enhancement film of the backlight module in order to reduce the cost of the backlight module.

Furthermore, the color polarizing layer 14 is formed by multiple RGB three primary color films, including a first color film layer 141 and a second color film layer 142 overlapped with the first color film layer 141. A refractive index of the first color film layer 141 is greater than a refractive index of the second color film layer 142. In the present embodiment, the color polarizing layer includes multiple first color film layers and multiple second color film layers. Specifically, the number of each of the first color film layers 141 and the second color film layers 142 is eight. The eight first color film layers 141 and the eight second color film layers 142 are disposed alternately and are overlapped. Specifically, between every two adjacent first color film layers 141, one of the second color film layers 142 is provided. At the same time, between every two adjacent second color film layers 142, one of the first color film layers 141 is provided. The color polarizing layer 14 is fixed to the light incident surface 121 through a transparent adhesive.

Furthermore, a refractive index of the first color film layer 141 is greater than a refractive index of the second color film layer 142. The first color film layer 141 is made of one of ZnS, TiO2, CeO, CeO2, Ta2O5 and SnO2. The second color filter is made of one of SiO2, MgF2, NaAlF6, ThF4 and BaF2. The color polarizing layer 14 further includes a glass substrate, and the glass substrate is used for carrying the first color film layer 141 and the second color film layer 142. A light wave of the color polarizing layer 14 includes a light that enters the color polarizing layer 14 with an angle substantially equal to the Brewster angle, a light vertically reflected by the color polarizing layer 14 and a transmitted light. Wherein, the transmitted light is mainly a P wave. The reflected light is main an S wave. In the transmitted light, a wavelength of the S wave is in a range of 430-680 nm, a transmittance of the S wave is less than 5%, transmittances of the P wave in ranges of 420-475 nm, 510-545 nm and 610-680 nm are about 90%. Transmittances of the P wave in ranges of 480-505 nm and 555-605 nm are about 30%. A polarization degree of the transmitted light in a range of 430 nm-680 nm>95%.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A backlight module, comprising
a plastic frame;
a backlight source; and
a light guide plate;
wherein, the backlight source and the light guide plate are received in the plastic frame; the light guide plate includes a light incident surface and a light emitting surface; the backlight source includes a circuit board, a reflecting collimator lens fixed to the circuit board and a LED lamp disposed inside the reflecting collimator lens; the reflecting collimator lens includes a parabolic reflecting surface, and the LED lamp is located at a center location of the parabolic reflecting surface; the light incident surface is covered with a color polarizing layer, and the parabolic reflecting surface faces toward the color polarizing layer.

2. The backlight module according to claim 1, wherein, the light guide plate includes a bottom surface disposed oppositely to the light emitting surface, the light incident surface is connected with the bottom surface and the light emitting surface, and an included angle is formed between the light incident surface and the bottom surface.

3. The backlight module according to claim 2, wherein, the first color film layer is made of one of ZnS, $TiO_2$, CeO, $CeO_2$, $Ta_2O_5$ and $SnO_2$.

4. The backlight module according to claim 2, wherein, the second color filter is made of one of $SiO_2$, $MgF_2$, $NaAlF_6$, $ThF_4$ and $BaF_2$.

5. The backlight module according to claim 2, wherein, the included angle between the light incident surface and the bottom surface is greater than 0 degree and less than 90 degrees.

6. The backlight module according to claim 1, wherein, the color polarizing layer includes a first color film layer and a second color film layer overlapped with the first color film layer, and a refractive index of the first color film layer is greater than a refractive index of the second color film layer.

7. The backlight module according to claim 6, wherein, the color polarizing layer further includes a glass substrate, and the glass substrate is used for carrying the first color film layer and the second color film layer.

8. The backlight module according to claim 6, wherein, the first color film layer is made of one of ZnS, TiO2, CeO, CeO2, Ta2O5 and SnO2.

9. The backlight module according to claim 6, wherein, the second color filter is made of one of SiO2, MgF2, NaAlF6, ThF4 and BaF2.

10. The backlight module according to claim 1, wherein, the color polarizing layer includes multiple first color film layers and multiple second color film layers, the first color film layers and the second color film layers are disposed alternately and are overlapped, and a refractive index of each first color film layer is greater than a refractive index of each second color film layer.

11. A display device including a backlight module and a liquid crystal panel, and the backlight module, comprises:
a plastic frame;
a backlight source; and
a light guide plate;
wherein, the backlight source and the light guide plate are received in the plastic frame; the light guide plate includes a light incident surface and a light emitting surface; the backlight source includes a circuit board, a reflecting collimator lens fixed to the circuit board and a LED lamp disposed inside the reflecting collimator lens; the reflecting collimator lens includes a parabolic reflecting surface, and the LED lamp is located at a center location of the parabolic reflecting surface; the light incident surface is covered with a color polarizing layer, and the parabolic reflecting surface faces toward the color polarizing layer; the liquid crystal panel is installed on the backlight module, a light emitted from the backlight source enters the liquid crystal panel after emitted from the light emitting surface of the light guide plate.

12. The display device according to claim 11, wherein, the light guide plate includes a bottom surface disposed oppositely to the light emitting surface, the light incident surface is connected with the bottom surface and the light emitting surface, and an included angle is formed between the light incident surface and the bottom surface.

13. The display device according to claim 12, wherein, the first color film layer is made of one of ZnS, $TiO_2$, CeO, $CeO_2$, $Ta_2O_5$ and $SnO_2$.

14. The display device according to claim 12, wherein, the included angle between the light incident surface and the bottom surface is greater than 0 degree and less than 90 degrees.

15. The display device according to claim 11, wherein, the color polarizing layer includes a first color film layer and a second color film layer overlapped with the first color film layer, and a refractive index of the first color film layer is greater than a refractive index of the second color film layer.

16. The display device according to claim 15, wherein, the second color filter is made of one of $SiO_2$, $MgF_2$, $NaAlF_6$, $ThF_4$ and $BaF_2$.

17. The display device according to claim 15, wherein, the color polarizing layer further includes a glass substrate, and the glass substrate is used for carrying the first color film layer and the second color film layer.

18. The display device according to claim 11, wherein, the color polarizing layer includes multiple first color film layers and multiple second color film layers, the first color film layers and the second color film layers are disposed alternately and are overlapped, and a refractive index of each first color film layer is greater than a refractive index of each second color film layer.

* * * * *